United States Patent [19]
Auvray

[11] Patent Number: 5,564,076
[45] Date of Patent: Oct. 8, 1996

[54] PORTABLE DIGITAL SIGNAL TRANSCEIVER PROVIDING COMMUNICATION VIA A TERRESTRIAL NETWORK AND VIA A SATELLITE NETWORK

[75] Inventor: Gérard Auvray, Bezons, France

[73] Assignee: Alcatel Mobile Communication France, Paris, France

[21] Appl. No.: 263,438

[22] Filed: Jun. 21, 1994

[30] Foreign Application Priority Data

Jun. 25, 1993 [FR] France .................... 93 07775

[51] Int. Cl.$^6$ ..................... H04B 1/38
[52] U.S. Cl. ............... 455/76; 455/77; 455/87; 455/89; 455/190.1; 455/314
[58] Field of Search ............ 455/3.2, 74, 76–77, 455/86–87, 84, 89, 120, 129, 142–144, 189.1, 190.1, 313, 318, 344, 314; 379/59; 370/95.3

[56] References Cited

U.S. PATENT DOCUMENTS

| | | | |
|---|---|---|---|
| 3,703,685 | 11/1972 | Simopoulos et al. | 455/273 |
| 4,479,256 | 10/1984 | Sewerinson | 455/265 |
| 5,301,364 | 5/1994 | Arens et al. | 370/95.3 |
| 5,319,799 | 6/1994 | Morita | 455/86 |
| 5,394,561 | 2/1995 | Freeburg | 455/56.1 |
| 5,437,051 | 7/1995 | Oto | 455/189.1 |

FOREIGN PATENT DOCUMENTS

| | | |
|---|---|---|
| 0540808A2 | 4/1992 | European Pat. Off. |
| 0076625 | 4/1988 | Japan ............ 455/77 |

OTHER PUBLICATIONS

"Study on the Integration Between the GSM Cellular Network and a Satellite System", *IEE Colloquim on Personal Communications*, Delli et al., Jan. 22, 1993, pp. 588–592.

"Odyssey—Personal Communications For the Future", *1994 IEEE National Telesystems Conference*, Mock, P., May 26–28 1994, pp. 139–142.

Mason, Charles, "Iridium Forges Ahead with It's Grand PCN Plan"; *Telephony*; Nov. 1, 1993; pp. 29–30 and 34.

Mazzella et al, "Multiple Access Techniques and Spectrum Utilisation of the Globalstar Mobile Satellite System", *Fourth IEE Confrence on Telecommunications*, Apr. 18–21 1993, pp. 306–311.

French Search Report FR 9307775.

*Primary Examiner*—Andrew Faile
*Attorney, Agent, or Firm*—Sughrue, Mion, Zinn, Macpeak & Seas

[57] ABSTRACT

A dual mode portable digital radio transceiver for communicating via a terrestrial network (first mode) and via a satellite network (second mode) synthesizes a modulation first frequency for modulation of signals transmitted in both modes and a conversion second frequency for demodulation of signals received in the two modes. It divides the conversion second frequency supplying a conversion third frequency for demodulation of signals received in one of the modes using a signal receive frequency band far away from the other frequency bands used. It is therefore possible, using a single synthesized pure carrier, to carry out direct conversion in a first mode and intermediate frequency conversion followed by the same direct conversion in the second mode.

17 Claims, 3 Drawing Sheets

PORTABLE DIGITAL SIGNAL TRANSCEIVER PROVIDING COMMUNICATION VIA A TERRESTRIAL NETWORK AND VIA A SATELLITE NETWORK

BACKGROUND OF THE INVENTION

1. Field of the Invention

The field of the invention is that of digital radio.

To be more precise, the invention concerns a dual mode portable transceiver, i.e. a transceiver able to operate in either of two transmission systems, firstly a terrestrial radio network, for example a cellular network, and secondly a satellite radio network. One specific field of application of the invention is to GSM (Global System for Mobile communications) DCS 1800 terrestrial radio and Globalstar/Inmarsat satellite radio.

2. Description of the Prior Art

These two radio networks naturally have to use different frequency bands. The GSM DCS 1800 terrestrial system uses transmit frequencies in the 1 710 MHz to 1 785 MHz band and receive frequencies in the 1 805 MHz to 1 880 MHz band. The Globalstar satellite system uses the 1 610 MHz to 1 625.5 MHz transmit frequency band and the 2 483.5 MHz to 2 500 MHz band.

These different frequency bands require the presence, in a dual mode transceiver, of transmit and receive means specific to each mode of operation (terrestrial or satellite). This increases the cost, the overall size, the weight, and the power consumption of the receiver. These features are crucial to the design of a portable device, and a constant preoccupation is to reduce them.

If the frequency bands in question are close together, it may be possible to use the same transmit and/or receive means subject to some adaptation. This applies to the transmit frequency bands of the GSM and Globalstar systems, for example. On the other hand, if the frequency bands are relatively far apart (as is the case with the receive frequency bands of these systems), it is essential to use duplicate transmit and/or receive means, and in particular duplicate modulator and/or demodulator means. This leads to problems with weight, power consumption, etc.

One object of the present invention is to alleviate these drawbacks of the prior art.

To be more precise, it is an object of the invention to provide a dual mode portable digital signal transceiver for terrestrial and satellite radio, in which the increase in overall size, weight, and power consumption as compared with monomode (terrestrial or satellite) transceivers is small.

In particular, an object of the invention is to provide a transceiver of this kind which does not require duplication of all the receive and/or transmit subsystems, even when the relevant frequency bands are relatively far apart.

SUMMARY OF THE INVENTION

These objects, and others that emerge below, are achieved in accordance with the invention by means of a dual mode portable digital signal transceiver providing communication, in a first transmission mode, via a terrestrial network using a transmit first frequency band (i.e., a terrestrial transmit frequency band) and a receive second frequency band (i.e., a terrestrial receive frequency band) and, in a second transmission mode, via a satellite network using a transmit third frequency band (i.e., a satellite transmit frequency band) and a receive fourth frequency band (i.e., a satellite receive frequency band), said first frequency band and said third frequency band being substantially adjoining and said second frequency band and said fourth frequency band being far apart, the transceiver comprising means for synthesizing a modulation first frequency for modulation of signals transmitted in said first frequency band and said third frequency band and a conversion second frequency for demodulation of signals received in said second frequency band and said fourth frequency band, and means for dividing said conversion second frequency, supplying a conversion third frequency for demodulation of signals received in said fourth frequency band and said second frequency band.

Thus, in accordance with one essential feature of the invention, two demodulation frequencies are available but only one frequency synthesizer is required, the second frequency being obtained by dividing down the first, which is generated by the synthesizer. This produces a saving in weight, in overall size, and in power consumption, which is essential in the case of a portable transceiver. Demodulation of one of the bands requires the use of the conversion second and third frequencies while demodulation of the other band uses only the second frequency (in one specific embodiment a fourth frequency may be needed).

The device advantageously comprises:

modulation means on two paths in phase quadrature controlled by said first frequency carrying out direct conversion modulation of signals transmitted in said first frequency band and said third frequency band;

first conversion means on two paths in phase quadrature controlled by said second frequency carrying out direct conversion demodulation of signals received in said second frequency band and said fourth frequency band;

second intermediate frequency conversion means controlled by said third frequency supplying the product of signals received in said fourth frequency band and said second frequency band by said third frequency and supplying an intermediate frequency signal to be demodulated by said first conversion means.

Thus, in a first mode demodulation, uses direct conversion and, in the second mode, an intermediate frequency. The quadrature conversion means are used in both modes. This produces a saving in overall size and power consumption.

In another specific embodiment of the invention said second frequency controls an intermediate frequency conversion means, and said transceiver then comprises means for generating a fixed fourth frequency for controlling the direct conversion, quadrature conversion, and modulation means.

Said frequency divider means preferably divide by N, where N is an integer substantially equal to $\pm f_{r1}/(f_{r2}-f_{r1})$, where $f_{r1}$ correspondings to said fourth or said second frequency band, and $f_{r2}$ correspondings to said second frequency band or said fourth frequency band.

This second frequency can thus provide adequate direct intermediate frequency conversion for subsequent use of the quadrature conversion means.

The invention also concerns a dual mode portable digital signal transceiver providing communications, in a first transmission mode, via a terrestrial network using a transmit first frequency band and a receive second frequency band. In a second transmission mode, providing communication via a satellite network using a transmit third frequency band and a receive fourth frequency band. The second and fourth frequency bands are substantially adjoining, and the first and third frequency bands are far apart. This transceiver comprises means for synthesizing a conversion first frequency (for demodulation of signals received in said second and fourth frequency bands) and a modulation second frequency (for modulation of signals transmitted in said first and third frequency bands), and also comprises means for dividing said modulation second frequency supplying a modulation third frequency (for modulation of signals transmitted in said third frequency band and said first frequency band).

In this case it is the transmit frequency bands which are treated separately, as they are not close together.

The digital signals transmitted in said first mode are advantageously coded by means of a first type of coding, and the digital signals transmitted in said second mode are coded by means of a second type of coding; and said first modulation means or said first conversion means are selectively connected to first or second coding and decoding means according to the transmission mode in use.

In one specific embodiment of the invention, the device comprises second means for dividing said second frequency supplying a fourth frequency for converting at least one signal being processed to the intermediate frequency.

It is thus possible to carry out a second conversion to the intermediate frequency.

The device of the invention preferably comprises a first transmit/receive antenna for receiving at least one of said receive frequency bands and transmitting at least one of said transmit frequency bands, said frequency bands being substantially adjoining, and a second receive antenna and a second transmit antenna, said first antenna being directly associated with said first conversion means or said first modulation means and said second antenna being associated with said second conversion means or said second modulation means.

Accordingly, reception and transmission in the four frequency bands require only two antennas.

In this case, the device advantageously comprises means for selecting one of said antennas according to the transmission mode in use.

In another advantageous embodiment of the invention the transceiver comprises a single dual resonance antenna tuned to transmit and receive all said frequency bands. The invention applies to the GSM and Globalstar systems, among others, in which:

said first band of transmit frequencies is between 1 710 MHz and 1 785 MHz;

said first receive band is between 1 805 MHz and 1 880 MHz;

said second band of transmit frequencies is between 1 610 MHz and 1 625.5 MHz; and said second band of receive frequencies is between 2 483.5 MHz and 2 500 MHz.

In this case, said divider means advantageously divides by three.

Other features and advantages of the invention will emerge from the following description of a preferred embodiment of the invention given by way of non-limiting illustrative example only and from the appended drawings.

DETAILED DESCRIPTION OF THE PREFERRED EMBODIMENT

An object of the invention is thus to provide a dual mode radio transceiver for communications via a terrestrial network and via a satellite network.

Figure 1:
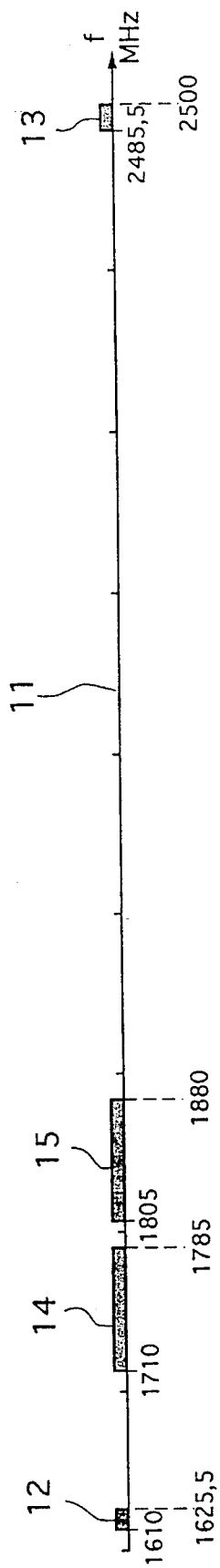
FIG. 1 shows the distribution of the transmit and receive frequency bands in the embodiment corresponding to GSM terrestrial transmission and Globalstar satellite transmission.

The preferred embodiment of the invention described below concerns a transceiver of this kind for GSM DCS 1800 cellular radio and Globalstar satellite radio. FIG. 1 shows the frequency bands used by these two systems.

These radio systems and the respective frequency bands are naturally only examples. The device of the invention can clearly be implemented in other frequency bands and for other systems.

FIG. 1 shows on the frequency axis 11 the frequency bands used by the Globalstar system, namely:

transmit (TX) frequency band 12:
1 610 MHz–1 625.5 MHz;

receive (RX) frequency band 13:
2 483.5 MHz–2 500 MHz;

and the frequency bands of the GSM system:

transmit (TX) frequency band 14:
1 710 MHz–1 785 MHz;

receive (RX) frequency band 15:
1 805 MHz–1 880 MHz.

This figure clearly shows that the GSM system frequency bands 14 and 15 are close together. They can therefore be transmitted and received using a bidirectional antenna. On the other hand, the Globalstar system frequency bands 12 and 13 are far apart, and two antennas are needed.

The receive bands 13 and 15 are also far apart. It is therefore not possible to receive them using the same receive means (antenna, baseband converters, etc).

Figure 2:
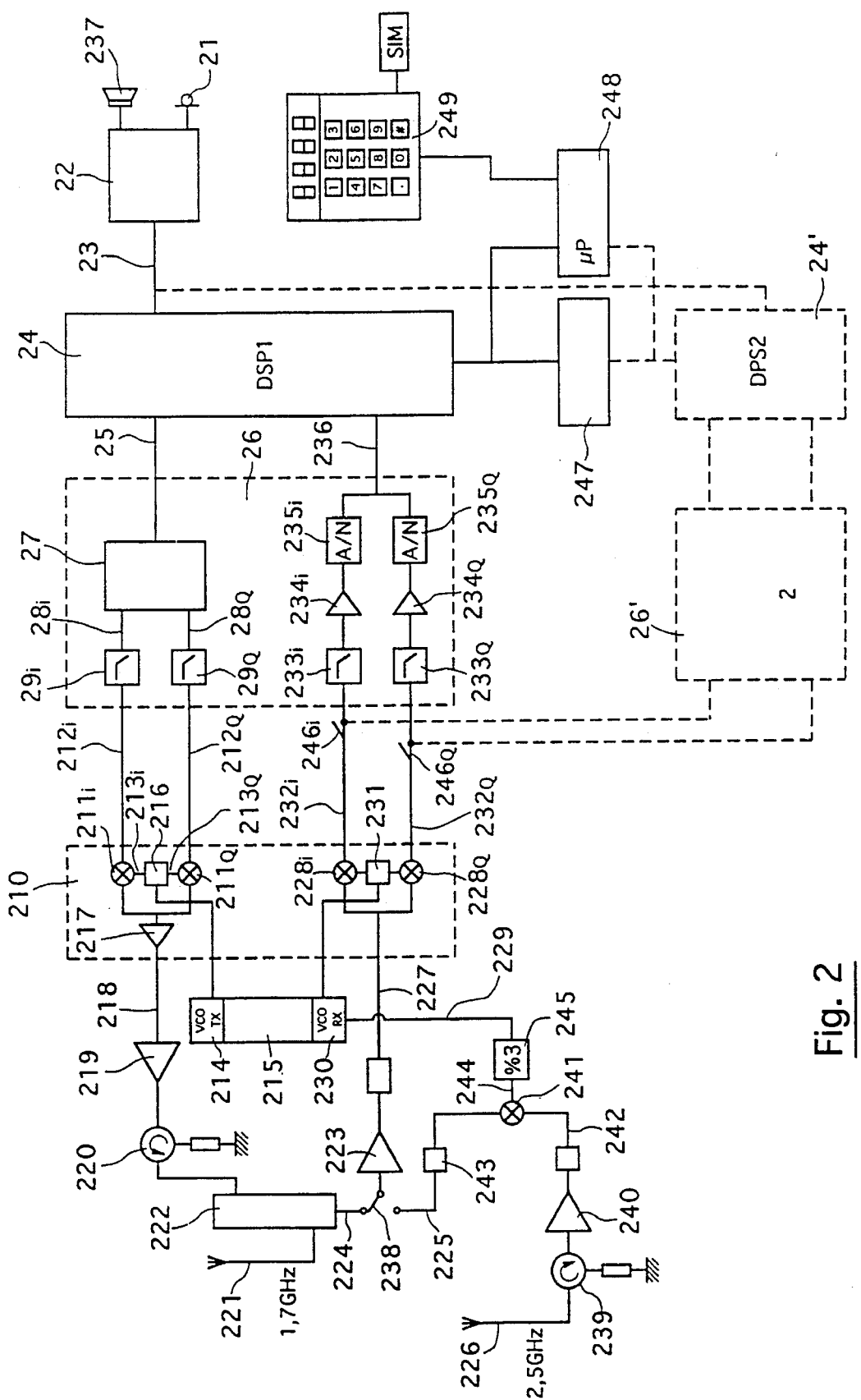
FIG. 2 is a block diagram of a transceiver in accordance with the invention using the FIG. 1 frequency bands.

FIG. 2 is a block diagram of the dual mode transceiver of the invention for the FIG. 1 frequency bands.

The transmit subsystem is described first. The transceiver comprises a microphone 21 which feeds sound signals to a speech coder module 22. The encoded speech signal 23 is passed to a digital signal processor (DSP) 24 which carries out the channel coding of the signal.

The DSP 24 is conventionally connected to a random access memory (RAM) 247. It is controlled by a microprocessor 248 connected to the keypad 249.

The DSP 24 feeds a signal 25 to a digital modulator subsystem 26 comprising a GSMK modulator module 27 producing two paths $28_I$ and $28_Q$ in phase quadrature. The two paths $28_I$ and $28_Q$ are filtered by respective low-pass filters $29_I$ and $29_Q$ and then passed to an analog modulator subsystem 210.

The subsystem 210 comprises two mixers $211_I$ and $211_Q$ which respectively produce the following products:

mixer $211_I$: product of the signal $212_I$ output by the filter $29_I$ with a pure carrier $213_I$ supplied by the transmit voltage-controlled oscillator (VCO) 214 of a frequency synthesizer module 215;

mixer $211_Q$: product of the signal $212_Q$ output by the filter $29_Q$ with a pure carrier $213_Q$ corresponding to the carrier $213_I$ phase-shifted 90° by the phase-shifter 216.

The two modulated paths are combined and amplified by a first amplifier 217 supplying a signal 218 to a power amplifier 219 and then to an optional circulator 220. The circulator 220 is connected to a bidirectional antenna 221 tuned to 1.7 GHz by a duplexer 222 the function of which is explained below.

The transmit means of the analog modulator subsystem 210 and the amplifier 219 are broadband means. They are chosen so that they can amplify the signal:

in the frequency band 1 610 MHz–1 625.5 MHz for the satellite mode;

in the frequency band 1 710 MHz–1 785 MHz for the terrestrial mode.

Thus the same means transmit in both modes, with no duplication of components. It suffices to adjust the modulation frequency supplied by the oscillator 214 to the specific frequency of the transmission mode in use.

In the case of reception, however, the same means cannot be used because the two receive bands 13 and 15 are far apart (see FIG. 1). The invention nevertheless offers a new solution, enabling the number of components duplicated to be reduced, and in particular enabling the use of only one analog modulator subsystem.

A low-noise receive amplifier 223 receives, depending on the receive mode selected, either the signal 224 received by the antenna 221 (terrestrial mode) or the signal 225 received by a second antenna 226 and then modified (satellite mode). Downstream of the amplifier 223 the signal is processed identically, regardless of the transmission mode.

The signal 227 output by the amplifier 223 feeds the subsystem 210 which carries out the baseband conversion. Two mixers $228_I$ and $228_Q$ receiving the baseband conversion frequency 229 generated by a receive oscillator 230 of the synthesizer module 215 effect the baseband conversion. A phase-shifter 231 provides the 90° phase-shift required for conversion of the quadrature path.

The baseband signals $232_I$ and $232_Q$ are passed to the digital demodulator subsystem 26 which comprises, for each of the I and Q paths, a low-pass filter $233_I$, $233_Q$, an amplifier $234_I$, $234_Q$ and an analog/digital converter $235_I$, $235_Q$.

The digitized signals 236 are fed to the signal processor module 24 whose functions include demodulation and channel decoding. The sound signal is reconstituted by the speech coder 24 and fed to a loudspeaker 237.

The different processing of the receive signals, according to the transmission mode, is described next.

The amplifier 223 is preceded by a switch 238 with two positions corresponding to respective transmission modes.

This can be a mechanical switch or a low-loss electrical switch such as an AsGa diode switch.

In a first position (terrestrial mode) the switch 238 connects the amplifier 223 to the duplexer 222 and therefore to the antenna 221. The broadband antenna 221 can transmit both transmit bands 12 and 14 and receive the receive band 13. This triple use reduces the overall size and weight of the portable receiver. The duplexer 22 separates the transmitted and received signals.

In the second position (satellite mode), the switch 238 makes the connection to the antenna 226 via a processor subsystem. The antenna 226 is tuned to 2.5 GHz, corresponding to the satellite receive band 15, and connected to an optional circulator 239 and thence to a low-noise amplifier 240.

The frequency band 15 (2.5 GHz) cannot be converted directly by the analog modulator subsystem 210. Thus, in accordance with the invention, the processing subsystem comprises a mixer 241 adapted to convert the received signal 242 to an intermediate frequency compatible with the conversion means. The mixer 241 is followed by a bandpass filter 243 supplying a signal 225 free of mixing spuriae.

The frequency $f_t$ for conversion to the intermediate frequency 244 is chosen such that:

$$f_t = f_{r1} + f_{r2}$$

where:

$f_t$ is the conversion frequency 244;

$f_{r1}$ is the modulation frequency of the signal received by the antenna 226 (approximately 2.5 GHz);

$f_{r2}$ is the modulation frequency of the signal received by the antenna 221 (approximately 1.8 GHz), i.e. the frequency at which the analog demodulator subsystem 210 operates.

In accordance with one essential feature of the invention, the conversion frequency $f_t$ is not synthesized in the conventional way by a VCO type frequency synthesizer. Instead, it is obtained from the conversion frequency 229 by a frequency divider 245. A single frequency synthesizer is therefore sufficient for conversion to the intermediate frequency 241 and for demodulation $288_I$, $288_Q$ in satellite mode. This represents a further saving in weight, overall size and power consumption.

Accordingly, demodulation of the signal 224 is by direct conversion by the subsystem 26 whereas demodulation of the signal 225 is at intermediate frequency under the control of a single local oscillator 230.

In the embodiment of the invention corresponding to the FIG. 1 frequency bands, the frequency divider 245 divides by three:

satellite receive frequency: $f_{r2}$=2 480 MHz;

terrestrial receive frequency (equal to the conversion frequency 229): $f_{r1}$=1 850 MHz.

It is a simple matter to show that by subtracting $f_t$=1 850/3 MHz~620 MHz from $f_{r2}$ the result is 2 480 MHz–620 MHz=1 860 MHz, i.e. substantially $f_{r1}$. The signal 225 at the frequency 1 860 MHz can be demodulated directly by the analog subsystem 26.

More generally, the frequency divider 245 divides by N and N is chosen such that:

$$f_{r2} \pm f_{r1}/N = f_{r1}$$

i.e. $N = \pm f_{r1}/(f_{r2} - f_{r1})$

The embodiment described above has numerous variants.

In particular, the modulation of all the signals and the demodulation of the signals in terrestrial mode is described above for direct conversion. This technique is advantageous for many reasons and in particular for its economy of resources (no conversion to the intermediate frequency), and therefore of cost, overall size and power consumption, not to mention the reduced risk of interference.

Figure 3:
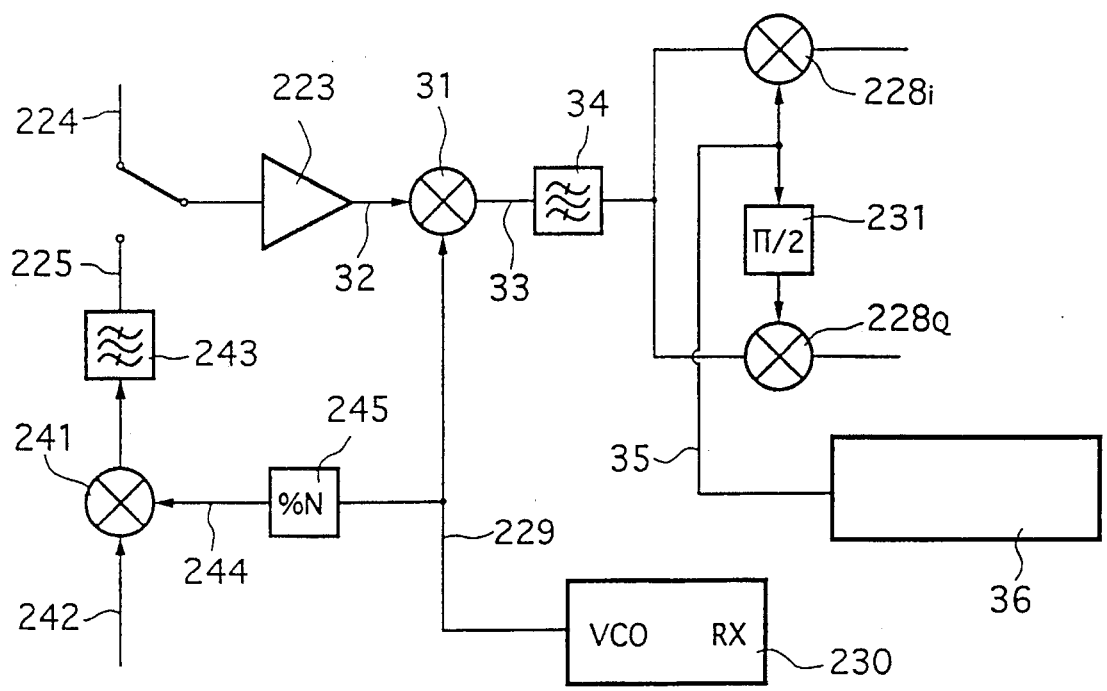
FIG. 3 shows one embodiment of the analog demodulator from FIG. 2.

However, the analog modulator subsystem 26 can comprise intermediate frequency conversion means. The various modulation and conversion frequencies can then advantageously be obtained from a single synthesizer frequency which is divided down to obtain the required frequencies. FIG. 3 shows this principle applied to demodulation (only the components different from those in FIG. 2 are described).

The voltage-controlled oscillator 230 generates a frequency 229 which controls a mixer 31 for converting the received signals 32 to the intermediate frequency, regardless of the transmission mode. To eliminate mixing spuriae the signal 33 output by the mixer 31 is filtered by a bandpass filter 34 before it is fed to the two mixers $228_I$ and $228_Q$.

The two mixers $228_I$ and $228_Q$ are controlled by a pure carrier 35 generated by a fixed frequency oscillator 36.

The mixer 241 is controlled by the frequency 244 obtained by dividing the frequency 229 by N (245).

The description of FIG. 2 presupposes that the digital processing carried out by the modules 24 and 26 is exactly the same in both transmission modes, so that these modules could be shared by the two modes. This assumes, for example, that satellite transmission and GSM transmission both use time-division multiple access (TDMA).

Other multiple access techniques can be used, however, such as frequency-division multiple access (FDMA) or code-division multiple access (CDMA).

In this case, the digital modules 24 and 26 can be partially duplicated, as shown in dashed line in FIG. 2.

If the received signal is from a satellite, the switches $246_I$ and $246_Q$ direct the I and Q paths $232_I$ and $232_Q$ to a demodulator subsystem 26, which carries out demodulation appropriate to the modulation employed and then a signal processor 24' which outputs a signal 23 to the speech coder module 22.

The second processor 24' advantageously shares the random access memory 247 and the control microprocessor 248 with the first.

Although not shown in FIG. 2, it is clear that the same distinction between the processing applied must be made on transmission.

To simplify the switching arrangements, and to reduce interference, the switches $246_I$ and $246_Q$ can be switched simultaneously with the switch 238 previously described.

Figure 4:
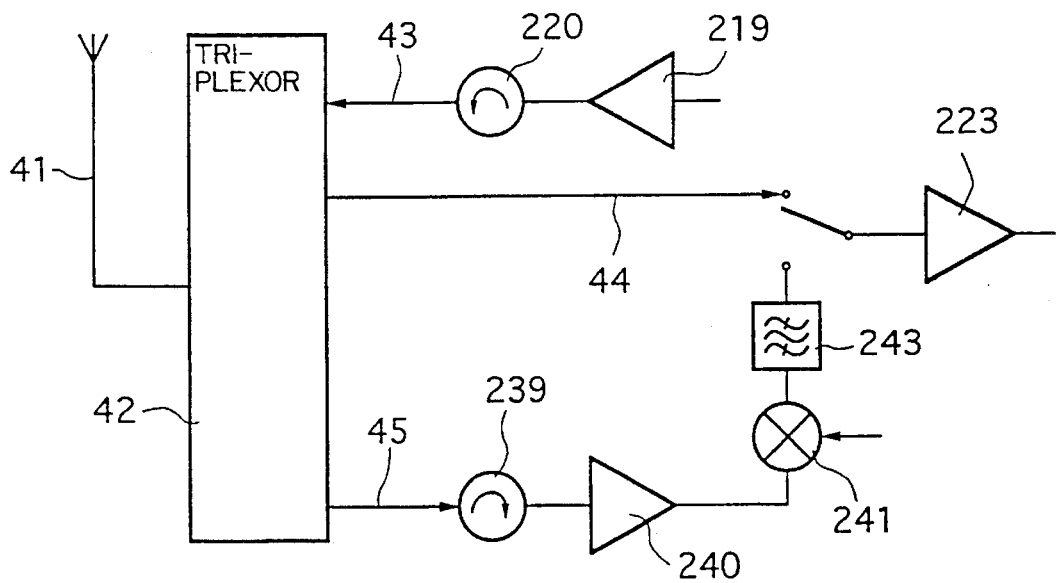
FIG. 4 shows one embodiment of the transceiver from FIG. 2 using a single dual-band antenna.

Finally, the use of two separate antennas (221 and 226) is not mandatory. The device of the invention can equally well be provided with a single dual-band antenna, as shown in FIG. 4. This further reduces the overall size and weight.

In this case the transceiver comprises a single dual resonance antenna 41 (resonant frequencies 1.8 GHz and 2.5 GHz).

The antenna is connected to a triplexer 42 feeding:

the signals 43 to be transmitted to the antenna 41;

the signals 44 received at the frequency $f_{r2}$=1.8 GHz to the amplifier 223;

the signals 45 received at the frequency $f_{r1}$=2.5 GHz to the optional circulator 239 and the amplifier 240.

Other embodiments are feasible without departing from the scope of the invention. In particular, the separate processing of the signals described for reception can be applied for transmission when the transmit frequency bands are far apart.

There is claimed:

1. A dual mode portable digital signal transceiver providing communication in a terrestrial mode and a satellite mode, said transceiver providing communication in said terrestrial mode via a terrestrial network using a terrestrial transmit frequency band and a terrestrial receive frequency band, said transceiver providing communication in said satellite mode via a satellite network using a satellite transmit frequency band and a satellite receive frequency band, said terrestrial transmit frequency band and said satellite transmit frequency band being substantially adjoining, and defining transmit bands of said transceiver, and said terrestrial receive frequency band and said satellite receive frequency band being far apart, and defining receive bands of said transceiver, said transceiver comprising:

synthesizer means for synthesizing a first frequency for modulation and a second frequency for demodulation; and divider means for dividing said second frequency to supply a third frequency for demodulation;

wherein signals transmitted in any of said transmit bands of said transceiver are modulated using said first frequency, wherein signals received in one of said receive bands of said transceiver are demodulated using said second frequency, and wherein signals received in another of said receive bands of said transceiver are demodulated using said third frequency.

2. The transceiver according to claim 1, further comprising:

modulation means on two paths in phase quadrature, controlled by said first frequency, for carrying out direct conversion modulation of signals transmitted in said transmit bands;

first conversion means on two paths in phase quadrature, controlled by said second frequency, for carrying out direct conversion demodulation of signals received in said one of said receive bands; and second conversion means, controlled by said third frequency, for mixing said third frequency with signals received in said another of said receive bands to supply intermediate frequency signals for demodulation by said first conversion means.

3. The transceiver according to claim 2, further comprising:

first coding and decoding means for coding digital signals to be transmitted in said terrestrial mode according to a first type of coding, and second coding and decoding means for coding digital signals to be transmitted in said satellite mode according to a second type of coding;

wherein said modulation means and said first conversion means are selectively connected to either said first or said second coding and decoding means depending upon which one of said terrestrial mode and said satellite mode is used.

4. The transceiver according to claim 2, further comprising:

a first antenna for receiving signals in said one of said receive bands, for transmitting signals in said terrestrial transmit frequency band, and for transmitting signals in said satellite transmit frequency band, wherein said one of said receive bands, said terrestrial transmit frequency band, and said satellite transmit frequency band are substantially adjoining.

5. The transceiver according to claim 4, further comprising:

a second antenna for receiving signals in said another of said receive bands;

wherein said first antenna is directly associated with said first conversion means and said modulation means, and wherein said second antenna is associated with said second conversion means.

6. The transceiver according to claim 5, further comprising:

means for selecting one of said first or said second antenna depending upon which one of said terrestrial mode and said satellite mode is used.

7. The transceiver according to claim 1, wherein:

said divider means divides by N, where N is a integer substantially equal to $\pm f_{r1}/(f_{r2}-f_{r1})$, and where either (1) $f_{r1}$ corresponds to said terrestrial receive frequency band and $f_{r2}$ corresponds to said satellite receive frequency band, or (2) $f_{r1}$ corresponds to said satellite receive frequency band and $f_{r2}$ corresponds to said terrestrial receive frequency band.

8. The transceiver according to claim 1, further comprising:

a first antenna for receiving signals in said one of said receive bands, for transmitting signals in said terrestrial transmit frequency band, and for transmitting signals in said satellite transmit frequency band, wherein said one of said receive bands, said terrestrial transmit frequency band, and said satellite transmit frequency band are substantially adjoining.

9. The transceiver according to claim 8, further comprising:

a second antenna for receiving signals in said another of said receive bands.

10. The transceiver according to claim 9, further comprising:

means for selecting one of said first or said second antenna depending upon which one of said terrestrial mode and said satellite mode is used.

11. The transceiver according to claim 1, further comprising:

one dual resonance antenna for sending signals in any of said transmit bands and for receiving signals in any of said receive bands.

12. The transceiver according to claim 1, further comprising:

oscillator means for supplying a fixed fourth frequency for demodulation;

first conversion means on two paths in phase quadrature, controlled by said fourth frequency, for carrying out direct conversion demodulation of output signals;

second conversion means, controlled by said third frequency, for mixing said third frequency with signals received in said another one of said receive bands to supply intermediate frequency signals for demodulation; and third conversion means, controlled by said second frequency, for mixing said second frequency with signals received in said one of said receive bands to supply intermediate frequency signals to be applied to said first conversion means.

13. The transceiver according to claim 1, wherein:

said terrestrial transmit frequency band is between 1710 MHz and 1785 MHz;

said terrestrial receive frequency band is between 1805 MHz and 1880 MHz;

said satellite transmit frequency band is between 1610 MHz and 1625.5 MHz; and said satellite receive frequency band is between 2483.5 MHz and 2500 MHz.

14. The transceiver according to claim 13, wherein:

said divider means divides by three.

15. A dual mode portable digital signal transceiver providing communication in a terrestrial mode and a satellite mode, said transceiver providing communication in said terrestrial mode via a terrestrial network using a terrestrial transmit frequency band and a terrestrial receive frequency band, said transceiver providing communication in said satellite mode via a satellite network using a satellite transmit frequency band and a satellite receive frequency band, said terrestrial receive frequency band and said satellite receive frequency band being substantially adjoining, and defining receive bands of said transceiver, and said terrestrial transmit frequency band and said satellite transmit frequency band being far apart, and defining transmit bands of said transceiver, said transceiver comprising:

synthesizer means for synthesizing a first frequency for demodulation and a second frequency for modulation; and divider means for dividing said second frequency to supply a third frequency for modulation;

wherein signals received in any of said receive bands of said transceiver are demodulated using said first frequency, wherein signals transmitted in one of said transmit bands of said transceiver are modulated using said second frequency, and wherein signals transmitted in another of said transmit bands of said transceiver are modulated using said third frequency.

16. The transceiver according to claim 15, further comprising:

conversion means on two paths in phase quadrature, controlled by said first frequency, for carrying out direct conversion demodulation of signals received in said receive bands;

first modulation means on two paths in phase quadrature, controlled by said second frequency, for carrying out direct conversion modulation of signals transmitted in said one of said transmit bands, and second modulation means, controlled by said third frequency, for mixing said third frequency with intermediate frequency signals supplied by said first modulation means for transmission in said another one of said transmit bands.

17. The transceiver according to claim 15, wherein:

said divider means divides by N, where N is a integer substantially equal to $\pm f_{r1}/(f_{r2}-f_{r1})$, and where either (1) $f_{r1}$ corresponds to said terrestrial transmit frequency band and $f_{r2}$ corresponds to said satellite transmit frequency band, or (2) $f_{r1}$ corresponds to said satellite transmit frequency band and $f_{r2}$ corresponds to said terrestrial transmit frequency band.

* * * * *